March 1, 1949. M. E. DUNKLEY 2,463,363
MILK TREATMENT WITH OXIDATION INHIBITING GASES
Filed Oct. 10, 1944
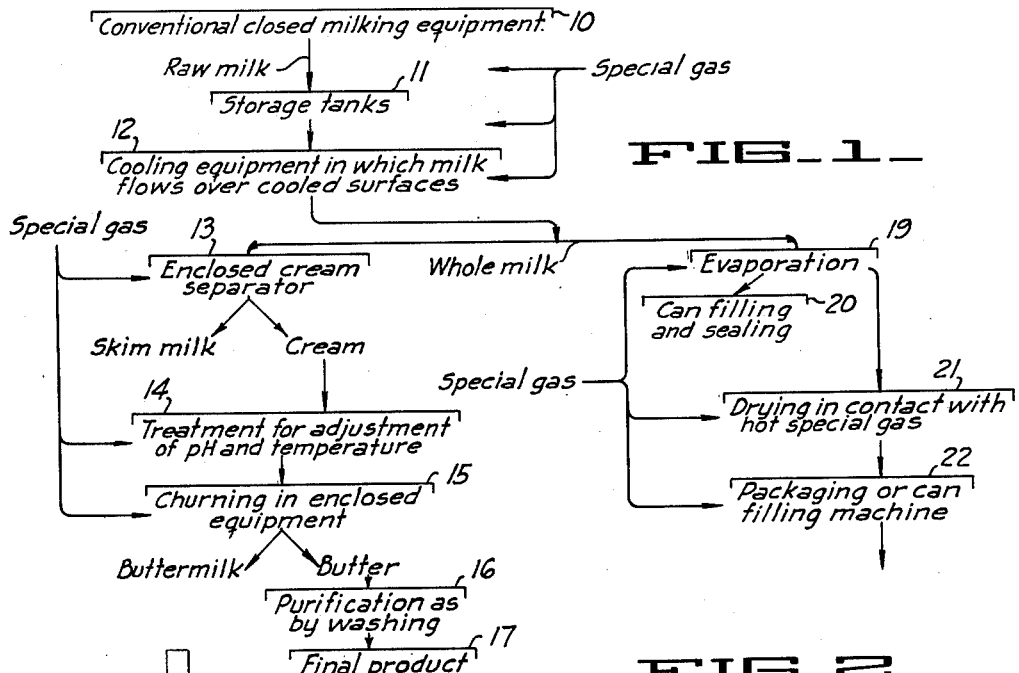
FIG_1_
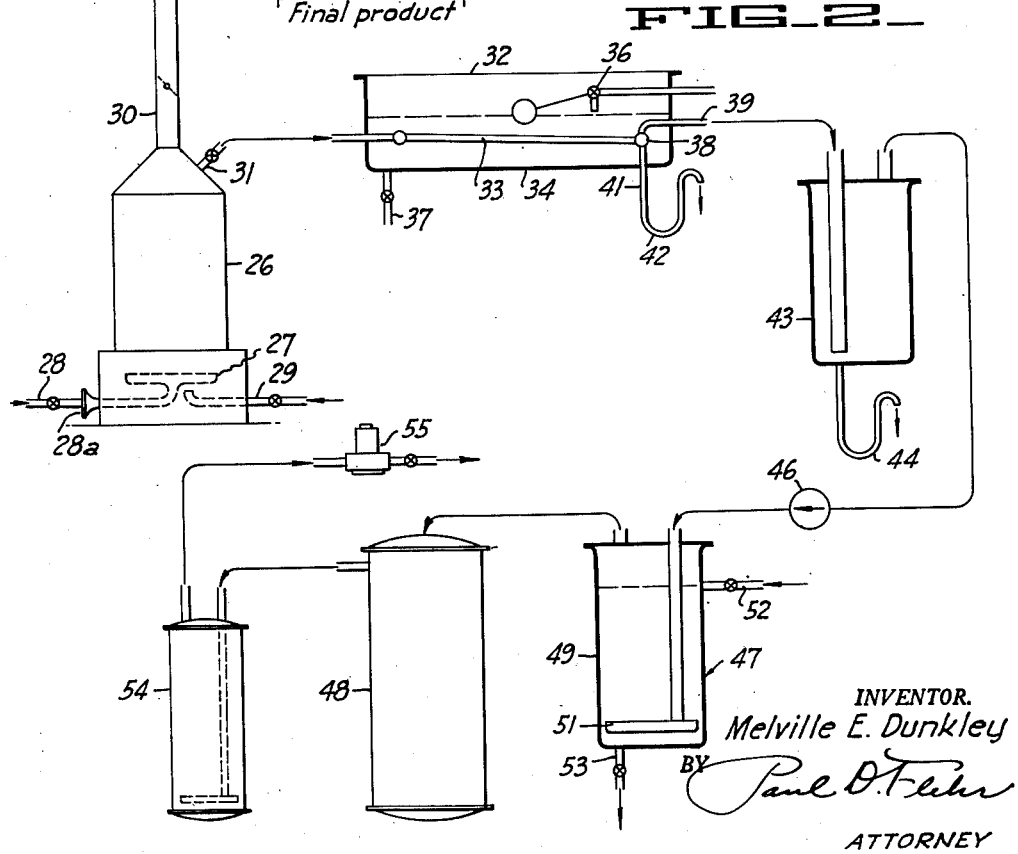
FIG_2_
INVENTOR.
Melville E. Dunkley
BY
ATTORNEY Patented Mar. 1, 1949

2,463,363

UNITED STATES PATENT OFFICE 2,463,363

MILK TREATMENT WITH OXIDATION INHIBITING GASES

Melville E. Dunkley, Modesto, Calif.

Application October 10, 1944, Serial No. 557,956

2 Claims. (Cl. 99—151)

This invention relates generally to processes involving the handling and treatment of dairy milk for the purpose of making one or more marketable dairy products.

In the past various treatments and processes have been developed for the purpose of inhibiting spoilage of dairy products and to inhibit the tendency of many of these products to develop off flavors. Such treatments include for example various applications of refrigeration, heat sterilization, introduction of small amounts of special chemicals, use of low temperature vacuum evaporation when producing concentrates, and use of various types of sealed containers. While such treatments have greatly improved the quality of dairy products, it is recognized by the industry that many dairy products could be further improved with respect to palatability and flavor, and that conventional processing to make possible preservation over long periods is accompanied by a substantial amount of impairment in palatability and flavor. For example canned evaporated milk as produced today by conventional processes has a very noticeable cooked flavor, and many of its ingredients are materially altered by the processing steps applied. Likewise spray dried whole milk produced by conventional methods when reconstituted with water, has an off flavor noticeably different from the original raw milk.

It is an object of the present invention to provide a process which is capable of producing dairy products of improved quality, including for example whole milk for domestic distribution, butter, canned evaporated milk, or spray dried milk powder, which products are characterized in particular by improved flavor.

Another object of the invention is to provide a process for the handling and treatment of whole milk which will completely avoid oxidation throughout processing.

Further objects of the invention will appear from the following description in which the preferred embodiments have been set forth in detail in conjunction with the accompanying drawing.

Referring to the drawing:

Fig. 1 is a flow sheet showing one procedure for carrying out the invention.

Fig. 2 is a diagrammatic view in side elevation showing suitable equipment for the manufacture of my special gas.

The present invention is characterized by the use of a non-oxidizing atmosphere with which the milk or other dairy products are contacted during process. As will be presently explained I receive the milk directly from the animal in such a non-oxidizing atmosphere, thus preventing an initial oxidation which inevitably occurs in ordinary dairy practice. While such initial oxidation by itself may not produce a noticeable off flavor, I have found that if such initial oxidation is prevented the quality and flavor of the end dairy product is greatly improved. I attribute this to the fact that whole milk initially oxidized by contact with the atmosphere as it is taken from the animal has its flavor materially impaired during subsequent processing, due to such initial oxidation, as well as to oxidation which may take place or continue during the processing.

One procedure for carrying out the invention is shown in the flow sheet of Fig. 1. As indicated step 10 represents conventional milking equipment, such as equipment of the De Laval type. As is well known to those skilled in the art, in the operation of such equipment milk is taken directly from the animal through suitable mechanical appliances and is deposited into a small sterile vessel or receiver having a capacity somewhat greater than the milk giving capacity of the animal. Such equipment is so constructed and operated that the interior of the milk receiving vessel is partially evacuated during its operation. However the atmosphere within the vessel contains a very substantial amount of oxygen, and therefore during the milking operation the milk is subjected to oxidation, which oxidation continues until such stages of subsequent processing where oxygen may be absent, as for example during vacuum evaporation. For example the coolers customarily employed for chilling the fresh raw milk frequently permit the milk to be in contact with air while heat is being removed. Likewise where an evaporated or concentrated milk is being subjected to spray drying to produce a powdered product, the gaseous drying medium employed is hot air which subjects the material to considerable oxidation.

I inhibit or prevent oxidation of milk as it is directly received from the animal by maintaining in the milk vessel of the milking equipment a gaseous atmosphere devoid of free oxygen. As will be presently explained it is desirable that this gaseous atmosphere be one capable of exerting a substantial inhibiting effect upon enzymic activity such as occurs in connection with oxidation, and therefore in the flow sheet such a gas has been indicated as being a "special gas." To maintain such an atmosphere in the milk receiving vessel it is only necessary to continuously bleed a small amount of special gas into the vessel.

Thus a gas supply pipe can be connected to the intake vent of the "pulsator" valve of milking equipment of the De Laval type, where ordinarily oxygen is drawn into the apparatus. The vessel can also be supplied with a simple drainage pipe and cock at the bottom of the vessel, whereby when it is desired to empty the contents of the vessel, this can be done through the bottom drainage pipe without involving contact of the milk with the atmosphere.

From the milking equipment 10 the raw milk, without contact with free oxygen or the atmosphere, is delivered to the storage tank or tanks 11, which are likewise connected to small bleed pipes through which the non-oxidizing gas is applied. Thus the material while in these tanks is continuously maintained in contact with the non-oxidizing atmosphere. From these tanks the milk is delivered to the cooling equipment 12, which can be of the conventional type wherein the milk is permitted to flow down in the form of a thin film over cooled pipes or like heat absorbing surfaces. In the carrying out of my process such cooling equipment is completely enclosed, and the inner closed space is likewise connected to a bleed pipe for continuous introduction of my non-oxidizing atmosphere, thereby maintaining an atmosphere of such gas in contact with the milk at all times.

The cooled milk may now be stored in suitable tanks, likewise in contact with the non-oxidizing gas, for distribution to the domestic trade or ordinary whole milk. Assuming however that it is to be made into other dairy products, a portion of this milk is shown being diverted to the cream separating operation 13, which can be carried out by the use of conventional centrifugal cream separators. Care is taken to have these separators completely enclosed, and the interior is likewise continuously supplied with non-oxidizing gas, whereby during such centrifugal treatment there is not any contact with free oxygen. The cream withdrawn from the centrifugal separators is shown being subjected to treatment 14 such as is conventionally applied for the purpose of adjusting the hydrogen ion concentration and temperature, preparatory to churning. The treatment vessels or equipment used for this purpose is likewise enclosed and an atmosphere of non-oxidizing gas is maintained therein. The cream thus treated is subjected to the churning operation 15 which is carried out by the use of conventional mechanical churning equipment. Here again the equipment is enclosed for the purpose of maintaining the material in contact with my non-oxidizing gas. The butter resulting from this operation is shown being subjected to operation 16 for purification as by washing, at which point suitable seasoning such as salt can likewise be added. The final product 17 can be packaged in various ways, as for example in sealed containers having an atmosphere of my special gas, or in conventional waxed paper packages. The characteristics of this product will be presently explained in greater detail, but it may be stated that in general it has keeping qualities and flavor superior to butter produced by conventional methods. The buttermilk produced by the churning operation 13 as well as the skim milk removed in operation 13 can be utilized for various purposes, as for example these materials can be merged together and subjected to vacuum evaporation to produce a concentrate, which concentrate is then spray dried or dried upon heated rolls to produce a final powdered product. Assuming that it is desired to produce a high quality powdered product, relatively free of oxidation, then the heated gas used in such drying operations is my special gas, as will be presently explained in connection with drying of whole milk.

The flow sheet also shows a portion of the whole milk being diverted to the evaporating operation 19. This operation can be conveniently carried out by the use of various types of evaporators, such as a multiple effect vacuum evaporator. Where the equipment utilized is of the type in which the liquid undergoing treatment is contacted with the gaseous atmosphere, then my special gas is utilized for this purpose in order to prevent oxidation. The concentrate resulting from evaporation can then be supplied to the can filling and sealing equipment 20, whereby it is introduced into sterile cans which are subsequently sealed. Here again the can filling and sealing equipment is preferably enclosed whereby these operations are carried out in an atmosphere of my special gas. It is desirable to have the head space of the final cans filled with the gas. Retorting of such cans for heat sterilization is not essential for preservation but can be carried out if desired to meet governmental regulations.

A portion of the evaporated milk concentrate is shown being subjected to the drying operation 21 to convert the same to powdered form. This can be carried out by the use of either conventional spray equipment or drying equipment of the roll or drum type. In either case my special gas is utilized as the hot gaseous drying medium. The powder produced from this drying operation is shown being supplied to the packaging or can filling equipment 22. Here again this equipment is enclosed whereby the powder is maintained in an atmosphere of my special gas. Likewise it is desirable that the gas in the final package be my special gas, in order to continue preservation of the material for an indefinite period. Preferably the package is one sealed with respect to the atmosphere, as for example sealed cans, but other containers such as cellophane bags or waxed paper cartons can be employed, where the material is to be consumed within a reasonable period of time.

The special gas which I employ for all of the various operations described above is preferably one of the type disclosed in my co-pending application Serial No. 515,663, filed December 27, 1943, which is now abandoned of which this application is a continuation-in-part. Such a special gas is produced by controlled burning of a suitable fuel such as natural gas, with the amount of combustion supporting oxygen or air employed being deficient compared to the amount required for complete combustion. Butane can be used in place of natural gas. Suitable equipment for the preparation of such gas is shown in Figure 2. Briefly it consists of a furnace chamber 26 which has its lower portion provided with a suitable gas burner 27. Gas supply pipe 28 connects to burner 27 and is provided with a conventional adjustable valve 28a for admitting a controlled amount of air to be intermixed with the gas. There is also a supplemental valve control pipe 29 which connects to the atmosphere and which serves to admit a controlled amount of secondary combustion supporting air into a region below the burner. The upper end of furnace chamber 26 is shown connected to the draft stack or flue 30 and in addition a pipe 31 is provided for withdrawing a required amount of the gaseous products of combustion. The amount of combustion supporting air is controlled so that the gaseous products of combustion formed in chamber 26 contain only traces of remaining oxygen, preferably less than 0.50%, and so that the carbon monoxide content of the products of combustion is of the order of from 0.5 to 40%, depending upon the control employed and the type of fuel being utilized, a suitable range with natural fuel gas being from 1.5 to 6%.

Other types of generating equipment can be used if desired, such as a gas producer of the "Kemp" type, provided the oxygen supply is controlled as previously described.

Pipe 31 connects with a suitable cooling apparatus 32 which can consist of pipes 33 which receive gas from pipe 31 and which are immersed within a body of cooling water maintained in the tank 34. Cooling water is shown being supplied to this tank through the float control valve 36 and is shown being withdrawn through pipe 37. A header pipe 38 connects with the cooling pipes 33 and in turn delivers the gas to pipe 39 leading from the cooling equipment. In addition header pipe 38 is shown connected to depending pipe 41 which terminates in a U-trap 42. Pipe 41 together with trap 42 serves the purpose of removing water condensing in the pipes 33, the watery vapor being a byproduct of the combustion in furnace chamber 26.

Pipe 39 is shown delivering the gas to a suitable separator 43, the lower end of which is also connected to a drainage trap 44. This separator serves to remove remaining droplets of water which may be entrained with the gas. The gas is pumped from separator 43 by compressor 46 which delivers the gas to the washer 47 and storage tank 48. The washer 47 can consist of a simple closed tank 49 provided with a perforated header 51 connected to the discharge side of compressor 46. Inlet and outlet pipes 52 and 53 are shown for the purpose of maintaining a body of washing liquid in tank 49, as for example cooled deaerated water. Within tank 48 the gas is stored at a suitable pressure such as 15 to 160 lbs. per square inch. As the gas is required it is withdrawn through the filter 54 and the pressure reducing regulator 55 which supplies the gas at a substantially constant desired pressure. Filter 54 can make use of a suitable filtering medium such as activated charcoal and serves to remove possible objectionable odors present in the gas.

The fuel gas which I have employed analyzes substantially as follows:

| | Percent |
|---|---|
| Methane, $CH_4$ | 87 |
| Ethane, $C_2H_6$ | 8 |
| Propane, $C_3H_3$ | 4 |
| Butanes, $C_4H_{10}$ | 1 |

In a typical instance proper controlled combustion as described above produces a satisfactory gas analyzing as follows:

| | Percent |
|---|---|
| Carbon dioxide, $CO_2$ | 8.2 |
| Acetylene, $C_2H_2$ | 0.1–0.2 |
| Oxygen, $O_2$ | 0.2–0.1 |
| Carbon monoxide, $CO$ | 3.8 |
| Methane, $CH_4$ | 2.2 |
| Nitrogen, $N_2$ | 85.5 |

While the effectiveness and peculiar properties of the above gas may be due to small amounts of gases not shown by the above analysis, according to my observations the effectiveness is due primarily to the presence of carbon monoxide and acetylene.

It is known that whole milk and dairy products made from the same contain enzymes which play an important part in oxidation and subsequent impairment in quality and spoilage. Actually these enzymes are complex organic catalysts, which play an important part in oxidation and respiration processes. In general they can be termed metabolites, and include carbohydrates, proteins, fats and like substances. The enzymes or catalysts which must be present in active state for such oxidation to proceed are generally metallo-porphyrin compounds, metallo-thianin compounds, or metallo-bio-catalysts. Probably many of such catalysts are complex compounds of the heavy metals principally iron and copper.

My special gas produced by the equipment and method described above, in the absence of oxygen, has a remarkable effect in poisoning or immunizing bio-catalysts of the type mentioned, thus effectively inhibiting oxidation of metabolites such as carbohydrates, proteins, fats and the like. The reactions involved are undoubtedly complex and cannot be outlined in detail. A significant fact with respect to the inhibiting properties of this gas is that although the initial action of the gas in inhibiting enzymes appears comparatively rapid, and is capable of penetrating into a liquid mass of food material, reconversion of the enzymes from an inhibited to a noninhibited state, after such treatment, occurs relatively slowly, and can be prevented entirely where the material is placed in hermetically sealed containers, such as tin cans, as previously described. Probably this is because after treatment with my gas and upon storage, any reversion of inhibited enzymes to a noninhibited condition is accompanied by a desorption of the absorbed gas. Enclosure of the treated material in a sealed container necessarily retards the rate with which such gas is evolved or arrests such evolution completely.

As my special non-oxidizing and enzyme inhibiting gas is supplied to the present process, enzymic action is inhibited immediately as the milk is taken from the animal, and the enzymes are maintained in such inhibited state throughout the process. Therefore such factors as tend to develop because of oxidation, including impairment of palatability and flavor, or general impairment in quality, cannot occur. Because of the way in which enzymic action is inhibited, such heat treatment as may be applied, will have much less effect in impairment of flavor and quality, than heat treatment for the same time and temperature values applied to milk where enzymic action has not been inhibited. For example drying in operation 21 can be carried out at a relatively high temperature level, with the production of a product of better quality than can be obtained by conventional methods.

Butter obtained by my process not only has a better quality and flavor when initially produced, but has better keeping qualities because of its ability to resist development of off or rancid flavor. In fact such butter can be stored for a substantial period of time at ordinary room temperatures, without noticeably impairing its quality and flavor.

Assuming that whole milk produced by my process is used for domestic distribution, it has better keeping qualities than conventional whole milk, both with respect to development of lactic acid concentration, and preservation of vitamin values, such as ascorbic acid.

As previously stated it is a highly desirable feature of my invention that the milk be received directly from the animal into a non-oxidizing and enzyme inhibiting gaseous atmosphere. In some instances however it may be desirable to apply principles of the present invention upon dairy milk which has been previously handled according to conventional methods, and which contains a considerable amount of absorbed air. To apply my process to such material, the milk is deaerated by subjecting it to a vacuum, after which it is intimately contacted with my special gas, as by pumping the gas through a mass of the deaerated material. To insure complete removal of free oxygen, such vacuumizing and contact with my special gas can be repeated. While with such material some oxidation is also incurred, further oxidation is immediately inhibited by the effect of my special gas. Material thus treated can be supplied to either the cream separating operation 13, or the evaporating operation 14, of the flow sheet shown in Figure 1.

I claim:

1. In a process for the treatment of whole dairy milk, contacting the fresh milk with a gas containing carbon monoxide and acetylene and substantially devoid of free oxygen.

2. In a process for the treatment of fresh lacteal material having a substantial butterfat content, contacting the material with a gas containing carbon monoxide and acetylene and substantially devoid of free oxygen.

MELVILLE E. DUNKLEY.

REFERENCES CITED

The following references are of record in the file of this patent:

UNITED STATES PATENTS

| Number | Name | Date |
| --- | --- | --- |
| 970,623 | Hemming | Sept. 20, 1910 |
| 1,250,079 | Bart | Dec. 11, 1917 |
| 1,384,318 | Heath | July 12, 1921 |
| 1,798,413 | Graves | Mar. 31, 1931 |
| 1,825,645 | Martin, Jr. | Sept. 29, 1931 |
| 2,007,043 | Feremutsch | July 2, 1935 |
| 2,143,947 | Jensen | Jan. 17, 1939 |